United States Patent
Zhang et al.

(10) Patent No.: US 10,878,188 B2
(45) Date of Patent: Dec. 29, 2020

(54) GENERATING DEPENDENCY PARSES OF TEXT SEGMENTS USING NEURAL NETWORKS

(71) Applicant: GOOGLE LLC, Mountain View, CA (US)

(72) Inventors: Yuan Zhang, Cambridge, MA (US); David Joseph Weiss, Philadelphia, PA (US)

(73) Assignee: Google LLC, Mountain View, CA (US)

( * ) Notice: Subject to any disclaimer, the term of this patent is extended or adjusted under 35 U.S.C. 154(b) by 31 days.

(21) Appl. No.: 16/084,470

(22) PCT Filed: Mar. 17, 2017

(86) PCT No.: PCT/US2017/023047
§ 371 (c)(1),
(2) Date: Sep. 12, 2018

(87) PCT Pub. No.: WO2017/161320
PCT Pub. Date: Sep. 21, 2017

(65) Prior Publication Data
US 2019/0073351 A1    Mar. 7, 2019

Related U.S. Application Data

(60) Provisional application No. 62/310,513, filed on Mar. 18, 2016.

(51) Int. Cl.
*G06F 17/27*    (2006.01)
*G06F 40/205*    (2020.01)
(Continued)

(52) U.S. Cl.
CPC .......... *G06F 40/205* (2020.01); *G06F 40/284* (2020.01); *G06N 3/04* (2013.01); *G06N 3/0454* (2013.01); *G06N 3/084* (2013.01)

(58) Field of Classification Search
CPC ... G06F 40/205; G06F 40/284; G06N 3/0454; G06N 3/04; G06N 3/084
(Continued)

(56) References Cited

U.S. PATENT DOCUMENTS

2011/0301942 A1    12/2011    Collobert et al.

FOREIGN PATENT DOCUMENTS

| CN | 1313972 | 9/2001 |
|----|---------|--------|
| JP | H03-263266 A | 11/1991 |

OTHER PUBLICATIONS

Ronan Collobert et al: "Natural Language Processing (almost) from Scratch", Journal of Machine Learning Research, vol. 12, Aug. 1, 2011 (Aug. 1, 2011), pp. 2493-2537, XP055273931, US ISSN: 1532-4435.*

(Continued)

*Primary Examiner* — Thierry L Pham
(74) *Attorney, Agent, or Firm* — Fish & Richardson P.C.

(57) ABSTRACT

Methods, systems, and apparatus, including computer programs encoded on computer storage media, for generating dependency parses for input text segments, which may be provided as inputs to a natural language processing system. One of the systems includes a first neural network comprising: one or more initial neural network layers configured to, for each token in an input text sequence: receive features for the token; and collectively process the features to generate an alternative representation of the features for use in determining a part of speech of the token in the input text sequence; and a dependency parsing neural network configured to: process the alternative representations of the features for the tokens in the input text sequence generated by the one or more initial neural network layers to generate a dependency parse of the input text sequence.

21 Claims, 4 Drawing Sheets

(51) Int. Cl.
G06N 3/08 (2006.01)
G06N 3/04 (2006.01)
G06F 40/284 (2020.01)
G06F 17/21 (2006.01)

(58) Field of Classification Search
USPC .......................................................... 704/9
See application file for complete search history.

(56) References Cited

OTHER PUBLICATIONS

Danqf Chen Et At: "A Fast and Accurate Dependency Parser using Neural Networks", Proceedings of the 2014 Conference on Empirical Methods in Natural Language Processing (EMNLP), Jan. 1, 2014 (Jan. 1, 2014), pp. 740-750, XP055383331, Stroudsburg, PA, USA DOi: 10.3115/v1/DI 4-1082.*
Alberti et al. "Improved transition-based parsing and tagging with neural networks," Proceedings of EMNLP, Sep. 2015, 6 pages.
Ballesteros et al. "Improved transition based parsing by modeling characters instead of words with lstms," arXiv 1508.00657, Aug. 4, 2015, 11 pages.
Bohnet et al. "A transition-based system for joint part-of-speech tagging and labeled non-projective dependency parsing," Proceedings of the 2012 joint Conference on Empirical Methods in natural Language Processing and Computational Natural Language Learning, Jul. 12, 2012, 11 pages.
Bottou. "Large-scale machine learning with stochastic gradient descent," Proceedings of COMPSTAT, Aug. 2010, 10 pages.
Chen et al. "A fast and Accurate Dependency Parser using Neural Networks," Proceedings of the 2014 Conference on Empirical Methods in Natural Language Processing, Jan. 1, 2014, 11 pages.
Cheng et al. "Open-domain name error detection using a multi-task rnn," Proceedings of the 2015 Conference on Empirical Methods in Natural Language Processing, ACM, Sep. 2015, 10 pages.
Collobert et al. "A unified architecture for natural language processing: Deep neural networks with multitask learning," Proceedings of the 25$^{th}$ International Conference on Machine Learning, Jul. 5, 2008, 8 pages.
Collobert et al. "Natural Language Processing (almost) from Scratch," Journal of Machine Learning Research, vol. 12, Aug. 1, 2011, 45 pages.
Dos Santos et al. "Learning character-level representations for part-of-speech tagging," Proceedings of ICML, Jun. 2014, 9 pages.
Durrett et al. "Neural crf parsing," arXiv 1507.03641, Jul. 13, 2015, 11 pages.
Dyer et al. "Transition based dependency parsing with stack long short-term memory," arXiv1505.08075v1, May 29, 2015, 10 pages.
FitzGerald et al. "Semantic role labeling with neural network factors," Proceedings of the 2015 Conference on Empirical Methods in Natural Language Processing, Sep. 2015, 11 pages.
Hatori et al. "Incremental joint pos tagging and dependency parsing in Chinese," Proceeding of 5$^{th}$ International Joint Conference on Natural Language Processing, Nov. 2011, 9 pages.
Kalchbrenner et al. "A convolutional neural network for modelling sentences," arXiv 1404.2188, Apr. 8, 2014, 11 pages.
Lei et al. "Low-rank tensors for scoring dependency structures," Proceedings of the 52$^{nd}$ Annual Meeting of the Association for Computation Linguistics, vol. 1 Long Papers, Jun. 2014, 11 pages.
Li et al. "Joint models for chines pos tagging and dependency parsing," Proceedings of the Conference on Empirical Methods in Natural Language Processing Association for Computational Linguistics, Jul. 27, 2011, 12 pages.
Li et al. "Joint optimization for Chinese POS tagging and dependency parsing," IEEE/ACM Transactions on Audio, Speech and Language Processing, 22(1), Jan. 1, 2014, 13 pages.
Liu et al. "Representation learning using multi-task deep neural networks for semantic classification and information retrieval," Microsoft Research, May 2015, 10 pages.
Luong et al. "Multi-task sequence to sequence learning," arXiv 1511.06114v4, Mar. 1, 2016, 10 pages.
Morante et al. "Dependency parsing and semantic role labeling as a single task," The 7$^{th}$ International Conference on Recent Advances in Natural Language Processing, Jan. 1, 2009, 6 pages.
PCT International Preliminary Report on Patentability issued in International Application No. PCT/US2017/023047, dated Jun. 14, 2018, 24 pages.
PCT International Search Report and Written Opinion issued in International Application No. PCT/US2017/023047, dated Jul. 17, 2017, 18 pages.
PCT Written Opinion issued in International Application No. PCT/US2017/023047, dated Feb. 28, 2018, 12 pages.
Petrov et al. "Improved inference for unlexicalized parsing," Human Language Technologies 2007: The Conference of the North American Chapter of the Association for Computation Linguistics, Apr. 2007, 8 pages.
Qian et al. "Joint Chinese word segmentation, pos tagging and parsing," Proceedings of the Joint Conference on Empirical Methosd in Natural Language Processing and Computational Natural Language Learning, Association for Computation Linguistics, Jul. 12, 2012, 11 pages.
Wang et al. "Joint pos tagging and transition-based constituent parsing in Chinese with non-local features," Proceedings of the 52$^{nd}$ Annual Meeting of the Association for Computational Linguistics, vol. 1: Long papers, Jun. 2014, 10 pages.
Weiss et al. "Structured training for neural network transition-based parsing," arXiv 1506.06158, Jun. 19, 2015, 11 pages.
Wolpert et al. "Stacked Generalization," Neural Networks, 5(2), Jan. 1992, 57 pages.
Wu et al. "Deep neural networks employing multi-task learning and stacked-bottleneck features for speech synthesis," IEEE International Conference on Acoustics, Speech and Signal Processing, Apr. 19, 2015, 5 pages.
Yim et al. "Rotating your face using multi-task deep neural network," Proceedings of the IEEE Conference on Computer Vision and Pattern Recognition, Jun. 2015, 9 pages.
Yu et al. "Factor-based compositional embedding models," NIPS, Dec. 2014, 5 pages.
Yuan et al. "Visual classification with multitask joint sparse representation," Image Processing, IEEE Transactions on Image Processing, 21(10), Oct. 2012, 12 pages.
Zhang et al. "Randomized greedy inference for joint segmentation, POS tagging and dependency parsing," Proceedings of the 2015 Conference of the North American Chapter of the Association for Computational Linguistics. Human Language Technologies, Jun. 2015, 11 pages.
Zhang et al. "Stack-propagation: Improved Representation Learning for Syntax," Proceedings of the 54$^{th}$ Annual meeting of the Association for Computational Linguistics, vol. 1 Long papers, Jun. 8, 2016, 10 pages.
Collobert et al, "Natural Language Processing (Almost) from Scratch" Journal of Machine Learning Research, Aug. 2011; 45 pages.
Hatori et al "Incremental Joint Approach to Word Segmentation, POS Tagging, and Dependency Parsing in Chinese", Proceedings of the 50$^{th}$ Annual Meeting of the Association of for Computational Linguistic, 2010, 9 pages.
JP Notice of Reasons for Rejection in Japanese Application No. 2018-539314 dated Aug. 5, 2019, 7 pages (with English translation).
KR Office Action in Korean Application No. 10-2018-7021920, dated Feb. 28, 2020, 6 pages (with English translation).
JP Office Action in Japanese Application No. 2018-539314, dated Apr. 20, 2020, 6 pages (with English translation).
EP Office Action in European Application No. 17717542.9, dated Aug. 27, 2020, 17 pages.

* cited by examiner

GENERATING DEPENDENCY PARSES OF TEXT SEGMENTS USING NEURAL NETWORKS

CROSS-REFERENCE TO RELATED APPLICATIONS

This application claims priority to International Application No. PCT/US2017/023047, filed Mar. 17, 2017, which claims the benefit of U.S. Provisional Application No. 62/310,513, filed Mar. 18, 2016, the contents of each are incorporated herein in their entirety.

BACKGROUND

This specification relates to generating dependency parses for text segments using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

Natural language processing is a field of computer science which is concerned with the interactions between computers and human (natural) languages. It has many applications including being used in providing human-machine natural language interfaces. Such interfaces may allow humans to control devices, for instance in a "smart environment", using only their voice.

Understanding the intention of a human based only on a spoken command or utterance can be a data-intensive task which can be difficult to perform accurately. As such, it is often not possible to understand the intention of a spoken command and so the intended operation (e.g. the control of a particular device in a particular way) may not be performed correctly or at all, despite the computational resources expended while attempting to understand the command.

It is therefore desirable to improve the reliability of natural language processing in order to reduce the occurrence of such situations. It may also be desirable to increase the speed of natural language processing and/or to reduce the use of computational resources.

One input that can be used in natural language processing is a dependency parse, which, generally speaking, defines the dependencies between the words in a text segment. That is, the dependency parse defines which words in the text segment depend on which other words in the text segment and, optionally, the type of each of the dependencies. This specification describes how a system implemented as computer programs on one or more computers in one or more locations can generate a dependency parse for an input text segment in an improved manner, thereby potentially improving the performance of natural language processing in respect of the input text segment.

Particular embodiments of the subject matter described in this specification can be implemented so as to realize one or more of the following advantages. By not directly using POS tags in generating a dependency parse of a text segment, the cascading of POS tagging errors in predicting the dependency parse of the text segment is reduced and the dependency parse can be accurately predicted. By not requiring lexicalized features to be used by the dependency parser neural network and by instead re-using representations generated by the initial neural network layers, the model that generates the dependency parses has a smaller size, i.e., is more compact, and can generate dependency parses faster than alternatives that use lexicalized features. As will be appreciated, by generating the dependency parse more quickly and/or more accurately, a responsive operation (e.g. the controlling of devices in a smart home), which is determined by a natural language processing system based on the input text segment and the dependency parse, can also be performed more quickly and/or accurately. In addition, by using a continuous form of stacking that allows for back-propagation down the pipeline across multiple tasks, i.e., across POS tagging and dependency parsing, the components of the model can be trained efficiently and quickly.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
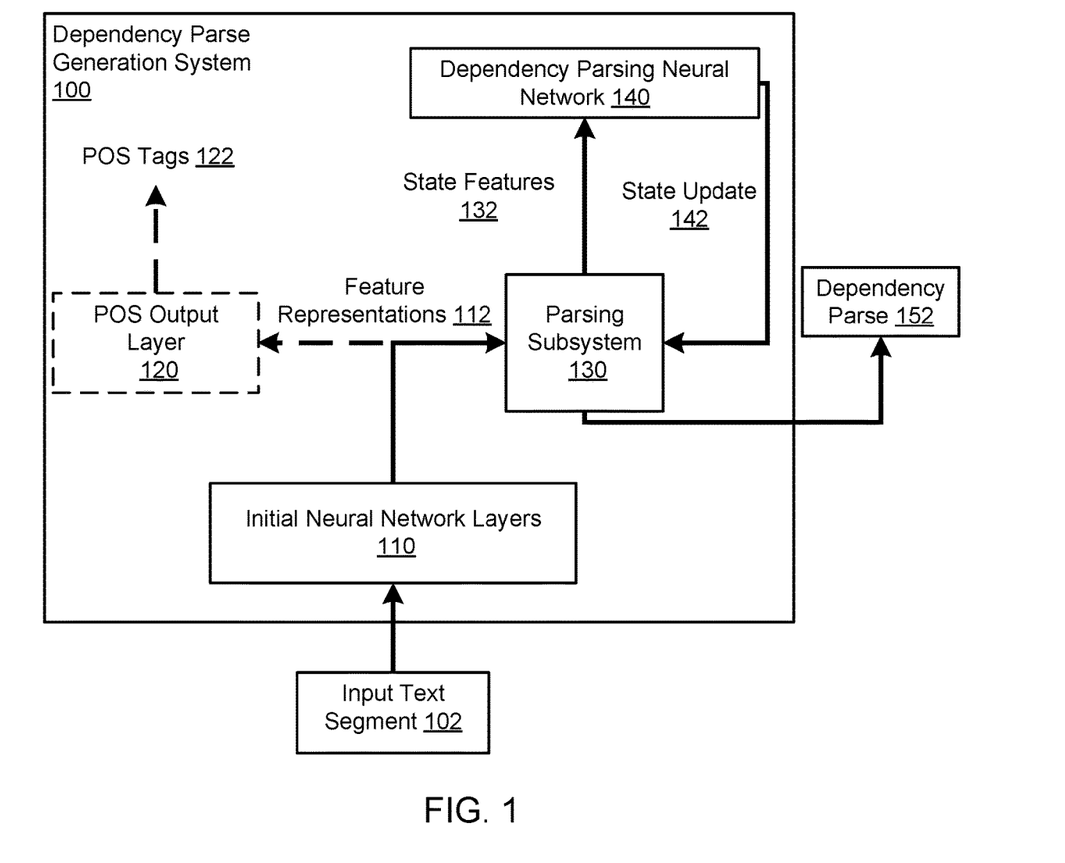
FIG. 1 shows an example dependency parse generation system.

FIG. 1 shows an example dependency parse generation system 100. The dependency parse generation system 100 is an example of a system implemented as computer programs on one or more computers in one or more locations, in which the systems, components, and techniques described below can be implemented.

The dependency parse generation system 100 receives input text segments 102 and generates a respective dependency parse 152 for each input text segment. Each input text segment is a sequence of tokens, i.e., a sequence of words and, optionally, punctuation marks, in a particular natural language. For example, the segment can be a sentence, a sentence fragment, or another multi-word sequence.

The dependency parse for a given text segment is data that defines dependency relationships between the tokens in the segment. In particular, the dependency parse identifies head words in the segment and the words and, optionally, punctuation marks in the segment that depend on the head words.

Optionally, the dependency parse can also include, for each word that depends on a given head word, a label that specifies the type of the relationship between the head word and the dependent word, e.g., whether the dependent word is an adjectival complement of the head word, an adverb modifier of the head word, a direct object of the head word, and so on. An example set of relationship types that can be specified between tokens in a dependency parse is described in http://nlp.stanford.edu/software/dependencies_manual.pdf.

In some cases, the dependency parse is a set of triples, with each triple identifying a head word from the segment, a dependent word from the segment, and the label that specifies the type of the relationship between the head word and the dependent word.

The dependency parse generation system 100 includes one or more initial neural network layers 110, a parsing subsystem 130, and a dependency parsing neural network 140. During training and, optionally, after training the dependency parse generation system 100 also includes a POS (part-of-speech) output layer 120.

As part of generating a dependency parse for an input text segment 102, the dependency parse generation system 100 processes a respective feature input for each token in the input text segment 102 using the initial neural network layers 110.

Generally, the feature input for a given token include features of the given token and features of one or more tokens surrounding the given token in the input text segment, i.e., tokens within a window of the given token in the input text segment.

The features of a token are vectors or other collections of numerical values characterizing the token. For example, the features of the token can include a one-hot encoded feature vector that identifies the token, i.e., that identifies the word or punctuation mark, a feature vector that indicates whether the token includes a symbol, e.g., a hyphen, a digit, or a punctuation, a feature vector that indicates whether the token is a word that includes a prefix or a suffix, a feature vector that indicates whether the token is a word that is capitalized, and so on.

In some implementations, the window is the same fixed size for each feature. In other implementations, different features have different window sizes. For example, the window size for the one-hot encoded feature vector that identifies the token can include tokens within three tokens of the given token while the feature vector that indicates capitalization can include tokens within one token of the given token.

The initial neural network layers 110 are feedforward neural network layers that are collectively configured to, for each token in the input segment, process the feature input for the token to generate a feature representation 112 for the token. A feature representation for a token is an alternative representation of the feature input for the token, i.e., a vector or other collection of numeric values that represent the feature input for the token.

For example, the initial neural network layers 110 may include an embedding layer followed by one or more fully-connected hidden layers.

The embedding layer is configured to receive the features in the feature input, which are generally sparse, to determine a respective embedding vector for each feature, and to combine, e.g., concatenate, the embedding vectors to generate a combined embedding of the features.

The one or more fully-connected hidden layers are configured to process the combined embedding to generate the feature representation for the token, i.e., by applying one or more non-linear transformations to the combined embedding.

The parsing subsystem 130 receives the feature representations 112 for the tokens in the input text segment 102 generated by the initial neural network layers 110 and uses the feature representations 112 to generate inputs for the dependency parsing neural network 140.

The dependency parsing neural network 140 is a feedforward neural network that is configured to receive state features 132, i.e., features of a current configuration of a parsing state maintained by the parsing subsystem 130, and to generate an output that defines a state update 142 to the current parsing state. In some implementations, the dependency parsing neural network 140 includes an embedding layer, one or more fully-connected hidden layers, and an output layer.

At any given time during the generation of a dependency parse, the parsing state maintained by the parsing subsystem 130 assigns a respective position in a stack or a buffer to some or all of the tokens in the input sequence and identifies the so-far generated dependency triples for the input segment. An example configuration of a parsing state is described in more detail in Danqi Chen and Christopher Manning, A Fast and Accurate Dependency Parser Using Neural Networks. In Proceedings of EMNLP 2014.

The state features of a given configuration are an ordered combination e.g., a matrix or a concatenated vector, of multiple feature representations, with each position in the ordered combination corresponding to a different position in the stack or the buffer of the parsing state.

In some implementations, to generate the state features for a current configuration of the parsing state, the parsing subsystem 130 selects as the feature representation at each position in the ordered combination the feature representation of the token that is in the corresponding position in the current configuration of the parsing state. Thus, each position in the ordered combination includes a feature representation from the corresponding position in the current configuration of the parsing state. As a simplified example, if the positions in the ordered combination are [buffer_0; stack_0; stack_1] and the current configuration includes token1 at position 0 in the buffer, token2 at position 0 in the stack, and token3 at position 1 in the stack, the state features for the current configuration will be [feature representation for token1, feature representation for token2, feature representation for token3]. If a position corresponding to one of the positions in the ordered combination is empty, the parsing subsystem 130 can add a designated null feature representation to the ordered combination.

In some implementations, each position in the ordered combination has a corresponding position in the current configuration of the parsing state and the features at the ordered combination position are a combination, e.g., a concatenation, of feature representations of the token that is at the corresponding configuration position and of feature representations of tokens that relate to the token that is at the corresponding configuration position according to the so-far generated dependency triples, e.g., the children and sibling tokens. If the token at the corresponding configuration position does not have a token having a particular relationship in the so-far generated triples, the system can use the designated null feature representation.

In some implementations, the ordered combination also includes numeric representations of the labels for the so-far generated dependency triples.

The parsing subsystem 130 and the dependency parsing neural network 140 generate the dependency parse 152 from the feature representations 112 by repeatedly updating the parsing state. Generating the dependency parse and updating the parsing state is described in more detail below with reference to FIGS. 2 and 3.

The POS output layer 120 is configured to process a feature representation 112 of a given token in the input text segment to generate an output that defines a POS tag 122 for the given token that defines a part-of-speech assignment for the given token. In particular, the POS output layer 120 is a softmax or other kind of neural network output layer that is configured to process the feature representation 112 to generate a respective score for each POS tag in a predetermined set of POS tags. Each score represents the likelihood that the corresponding part of speech is the part of speech of the token in the input text sequence.

Thus, the feature representations 112 can be used both to generate POS tags for the tokens in the input segment 102, i.e., by selecting the highest-scoring POS tag as the POS tag for the token, and to generate the dependency parse 152 of the input segment 102. However, the dependency parsing neural network 140 does not directly use the POS tags for the tokens when generating the dependency parse 152, i.e., by only using the feature representations 112.

In some implementations, once generated, the dependency parse generation system 100 provides the dependency parse 152 as input to another system for further processing. For example, the dependency parse generation system 100 can provide the dependency parse 152 as input to a natural language processing system that analyzes the input text segment 102, and causes performance of a responsive operation. For instance, the natural language processing system may be utilized to facilitate a human-machine natural language (e.g. voice) interface. In such examples, the responsive operations may include controlling devices in a smart environment. Other examples of operations which may be performed by the natural language processing system include sentiment analysis, question answering, summarization, or another natural language processing task. These operations can be performed, e.g., as part of processing user requests by, e.g., a smart speaker or other automated intelligent personal assistant service.

Instead of or in addition to providing the dependency parse 152 as input to another system, the dependency parse generation system 100 can store the dependency parse or provide data specifying the dependency parse for presentation to a user of the dependency parse generation system 100.

The dependency parse generation system 100 can train the initial neural network layers 110 and the dependency parsing neural network 140 to determine trained values of the parameters of the initial neural network layers 110 and the dependency parsing neural network 140. Training the initial neural network layers and the dependency parsing neural network is described in more detail below with reference to FIG. 4.

Figure 2:
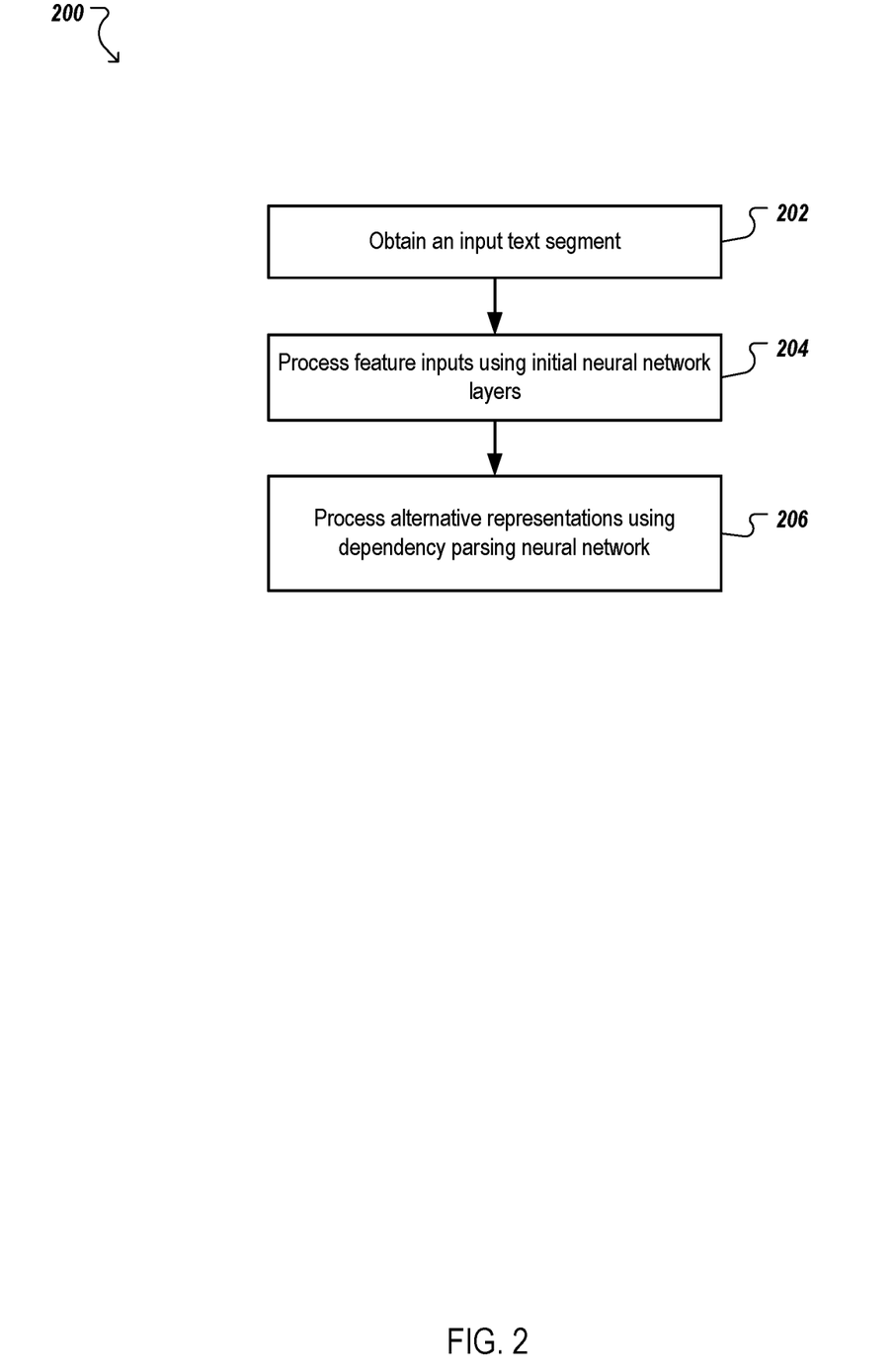
FIG. 2 is a flow diagram of an example process for generating a dependency parse for an input text segment.

FIG. 2 is a flow diagram of an example process 200 for generating a dependency parse for an input text sequence. For convenience, the process 200 will be described as being performed by a system of one or more computers located in one or more locations. For example, a dependency parse generation system, e.g., the dependency parse generation system 100 of FIG. 1, appropriately programmed, can perform the process 200.

The system obtains an input text segment (step 202). The input text segment includes multiple tokens, i.e., words and, optionally, punctuation marks, arranged according to an input order.

The system processes a feature input for each of the tokens in the input text segment through one or more initial neural network layers (step 204). As described above, the initial neural network layers are configured to process a feature input of a given token to generate a feature representation, i.e., an alternative representation of the features, for use in determining the part of speech of the token, i.e., for processing by the POS tag output layer, and for use in generating a dependency parse of the input text segment.

The system processes the alternative representations using a dependency parsing neural network to generate a dependency parse of the input text segment (step 206).

In particular, the system initializes a parsing state and repeatedly updates the parsing state using the dependency parsing neural network to generate the dependency parse. The initial parsing state can, for example, include a predetermined ROOT token in the stack, the tokens in the input segment in the buffer arranged according to their position in the input segment, and no already-generated dependency triples. The system repeatedly updates the parsing state until the parsing state is a terminal state and then treats the dependency triples in the terminal state as the dependency parse for the input text segment. For example, the terminal state can include an empty buffer and only the ROOT token in the stack.

Updating the parsing state is described in more detail below with reference to FIG. 3.

Figure 3:
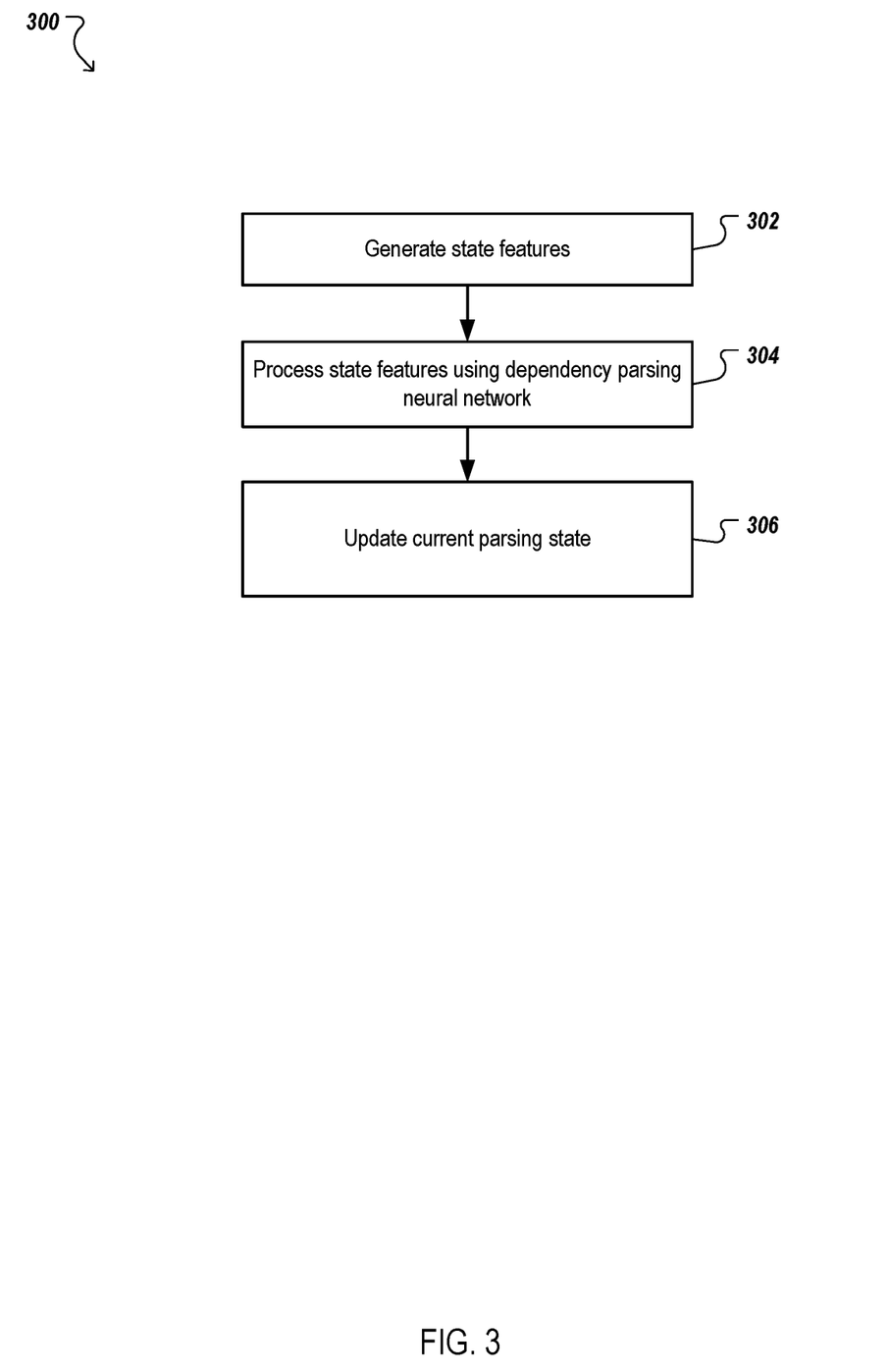
FIG. 3 is a flow diagram of an example process for updating a current parsing state.

FIG. 3 is a flow diagram of an example process 300 for updating a parsing state. For convenience, the process 300 will be described as being performed by a system of one or more computers located in one or more locations. For example, a dependency parse generation system, e.g., the dependency parse generation system 100 of FIG. 1, appropriately programmed, can perform the process 300.

The system generates state features using the current parsing state (step 302). In particular, the system generates an ordered combination of feature representations by adding, to each position in the ordered combination, the feature representation for the token that is at the corresponding position in the current configuration of the parsing state.

The system processes the state features using the dependency parsing neural network (step 304). The dependency parsing neural network is configured to process the state features to generate an output that defines an update to the current parsing state.

More specifically, the dependency parsing neural network generates a respective score for each potential update in a set of potential parsing state updates. The parsing state updates include an update that removes a token from the buffer and pushes it onto the stack and, for each possible label between a dependent word and a head word: (i) a respective left-arc update that marks the second token on the stack as a dependent of the first token, assigns the corresponding label to the dependency, and removes the second token from the stack and (ii) a respective right-arc update that marks the first token on the stack as a dependent of the second token, assigns the corresponding label to the dependency, and removes the first token from the stack. For example, the possible labels can be some or all of the relationship types in the set of relationship types described in http://nlp.stanford.edu/software/dependencies_manual.pdf.

The system updates the current parsing state using the output (step 306). In particular, the system selects an update from the possible updates using the scores, i.e., by selecting the update having the highest score or by sampling from the possible updates in accordance with the corresponding scores, and applies the update to the current parsing state to generate an updated parsing state.

If the updated parsing state is the terminal parsing state, the system selects the dependency parse defined by the updated parsing state as the final dependency parse for the text segment.

If the updated parsing state is not the predetermined terminal parsing state, the system repeats the process 300 with the updated parsing state in place of the current parsing state.

Figure 4:
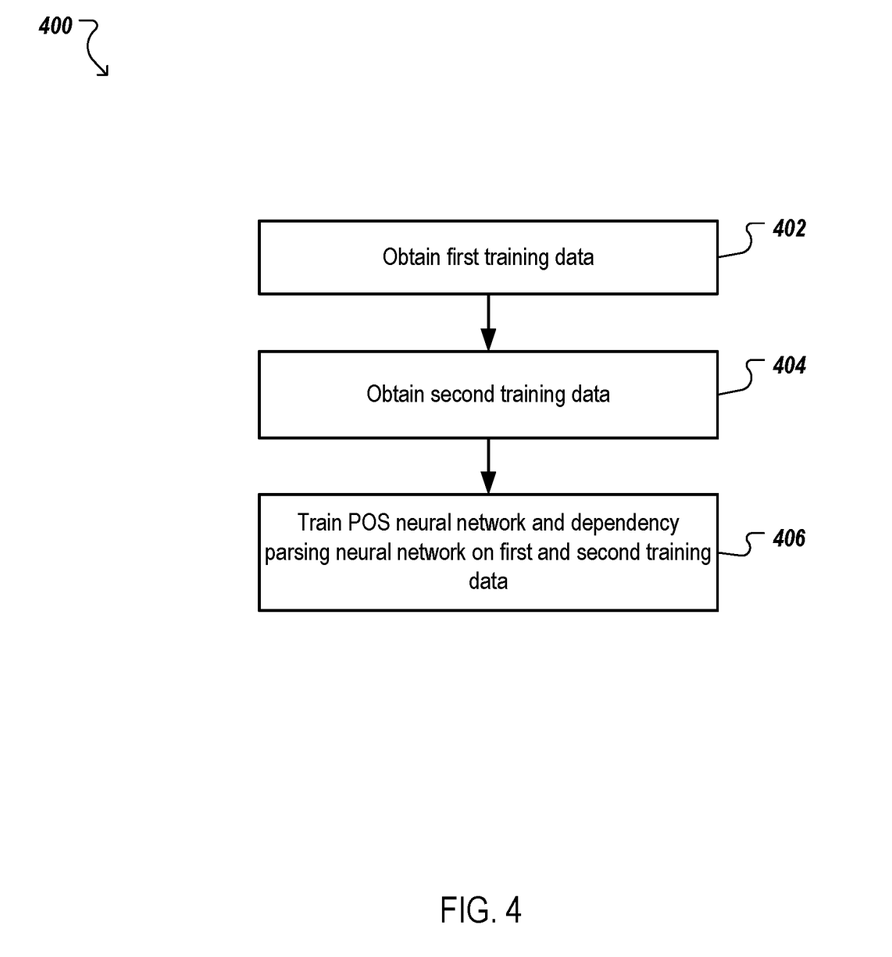
FIG. 4 is a flow diagram of an example process for training a POS tagging neural network and a dependency parsing neural network.

FIG. 4 is a flow diagram of an example process 400 for training a POS tagging neural network and a dependency parsing neural network. For convenience, the process 400 will be described as being performed by a system of one or more computers located in one or more locations. For example, a dependency parse generation system, e.g., the dependency parse generation system 100 of FIG. 1, appropriately programmed, can perform the process 400.

The system performs the process 400 to train a POS tagging neural network, i.e., a neural network that includes the one or more initial neural network layers and the POS output layer of FIG. 1, and a dependency parsing neural network, i.e., the dependency parsing neural network of FIG. 1.

The system obtains first training data that includes training text sequences and, for each training text sequence, a respective POS tag for each token in the training text sequence (step 402).

The system obtains second training data that includes training text sequences and, for each training text sequence, a set of parser states that defines a dependency parse of the training text sequence (step 404).

That is, for a given training text sequence in the second training data, the system obtains a set of (parser state, action) pairs that produce the dependency parse. The action in each (parser state, action) pair is the state update that should be applied to the parser state in the pair in order for the correct dependency parse to be generated for the training text sequence.

In some implementations, the system receives the (parser state, action) pairs. In other implementations, the system receives the dependency parse for the sequence and unrolls the dependency parse to determine the (parser state, action) pairs for the sequence.

The system then trains the POS neural network and the dependency parsing neural network on the first and second training data to determine trained values of the parameters of the initial neural network layers, the POS output layer (if the output layer has trainable parameters), and the dependency parsing neural network (step 306).

In particular, the system trains the networks by iteratively performing the following: (i) training the POS neural network on training examples from the first training data to update values of parameters of the POS neural network; and (ii) training the parsing neural network and the initial neural network layers on training examples from the second training data.

A training example from the first training data is a feature input for a token from one of the training sequences in the first training data and the corresponding POS tag for the token.

A training example from the second training data is state features corresponding to a (parsing state, action) pair in the second training data and the action from the (parsing state, action) pair.

The system can select the training examples for each iteration of operations (i) and (ii) randomly from the training examples in the corresponding training data.

To iteratively perform operations (i) and (ii), the system can repeatedly alternate between performing operation (i) and performing operation (ii). For example, the system can alternate between performing operation (i) for a first number of training epochs and performing operation (ii) for a second number of training epochs. In some implementations, the first number is equal to the second number. In some other implementations, the first number is different from the second number. The system can alternate between performing operations for a predetermined number of iterations, until all of the training examples in the training data have been sampled, or until some other termination criterion is satisfied.

To train the parsing neural network and the initial neural network layers on a training example from the second training data, the system determines a gradient of a parsing loss for the training example and backpropagates the gradient through the dependency parsing neural network and the initial neural network layers to update values of parameters of the dependency parsing neural network and the initial neural network layers, i.e., using a stochastic gradient descent with backpropagation training technique.

In particular, the system determines the parsing loss from an error between (i) the scores generated by the parsing neural network by processing the state features in the training example and (ii) and a set of scores that identifies the action in the training example as the state update to be applied to the state.

To train the POS neural network on a training example from the first training data, the system determines a gradient of a POS loss and backpropagates the gradient through the POS output layer and the initial neural network layers to update values of parameters of the initial neural network layers, i.e., using the same stochastic gradient descent with backpropagation training technique or a different stochastic gradient descent with backpropagation training technique.

In particular, the system determines the POS loss from an error between (i) the scores generated by the POS neural network by processing the feature input for the token in the training example and (ii) a set of scores that indicate that the POS tag in the training example is the correct POS tag for the token.

In some implementations, the system pre-trains the POS neural network prior to iteratively performing the training operations. That is, the system pre-trains the POS neural network by repeatedly performing operation (i) before beginning to perform operation (ii).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system implemented by one or more computers, the system comprising:
a first neural network comprising:
one or more initial neural network layers configured to, for each token in an input text sequence:
receive a feature input for the token; and
collectively process the feature input for the token to generate an alternative representation of the feature input for use in determining a part of speech of the token in the input text sequence; and
a dependency parsing neural network configured to:
process the alternative representations of the feature input for the tokens in the input text sequence generated by the one or more initial neural network layers to generate a dependency parse of the input text sequence, wherein the dependency parsing neural network is a state-based dependency parsing neural network and wherein the dependency parsing neural network is configured to generate the dependency parse by updating a current parser state by processing the alternative representation of the feature inputs for tokens in particular positions in the current parser state without directly using the parts of speech of the tokens in the input text sequence in generating the dependency parse.

2. The system of claim 1, wherein the first neural network further comprises:
an output layer configured to, for each token:
receive the alternative representation of the feature input and to generate a respective score for each of a plurality part of speech tags that represents the likelihood that the corresponding part of speech is the part of speech of the token in the input text sequence.

3. The system of claim 1, wherein the dependency parsing neural network is configured to receive a state feature input comprising the alternative representation of the feature inputs for tokens in particular positions in the current parser state and to process the state feature input to generate a respective score for each of a plurality of parser state updates.

4. The system of claim 1, wherein the dependency parsing neural network does not directly use the parts of speech of the tokens in the input text sequence in generating the dependency parse.

5. The system of claim 1, comprising a natural language processing system configured to:
analyze the input text sequence using the generated dependency parse as an input; and
based on the analyzed input text sequence, cause performance of an operation that is responsive to the input text sequence.

6. One or more non-transitory computer-readable storage media encoded with instructions that, when executed by one or more computers, cause the one or more computers to implement a neural network system comprising:
a first neural network comprising:
one or more initial neural network layers configured to, for each token in an input text sequence:
receive a feature input for the token; and
collectively process the feature input for the token to generate an alternative representation of the feature input for use in determining a part of speech of the token in the input text sequence; and
a dependency parsing neural network configured to:
process the alternative representations of the feature input for the tokens in the input text sequence generated by the one or more initial neural network layers to generate a dependency parse of the input text sequence, wherein the dependency parsing neural network is a state-based dependency parsing neural network and wherein the dependency parsing neural network is configured to generate the dependency parse by updating a current parser state by processing the alternative representation of the feature inputs for tokens in particular positions in the current parser state without directly using the parts of speech of the tokens in the input text sequence in generating the dependency parse.

7. A method for training a first neural network and a dependency parsing neural network,
wherein the first neural network comprises one or more initial neural network layers configured to, for each token in an input text sequence: receive a feature input for the token; and collectively process the feature input for the token to generate an alternative representation of the feature input for use in determining a part of speech of the token in the input text sequence; and an output layer configured to, for each token: receive the alternative representation of the feature input and to generate a respective score for each of a plurality part of speech tags that represents the likelihood that the corresponding part of speech is the part of speech of the token in the input text sequence,
and wherein the dependency parsing neural network is configured to:
process the alternative representations of the feature input for the tokens in the input text sequence generated by the one or more initial neural network layers to generate a dependency parse of the input text sequence, wherein the dependency parsing neural network is a state-based dependency parsing neural network and wherein the dependency parsing neural network is configured to generate the dependency parse by updating a current parser state by processing the alternative representation of the feature inputs for tokens in particular positions in the current parser state without directly using the parts of speech of the tokens in the input text sequence in generating the dependency parse,
the method comprising:
obtaining first training data that includes training text sequences and, for each training text sequence, a respective part of speech tag for each token in the training text sequence;
obtaining second training data that includes training text sequences and, for each training text sequence, a set of parser states that defines a dependency parse of the training text sequence; and training the first neural network and the dependency parsing neural network on the first and second training data, comprising iteratively performing the following:
  training the first neural network on training examples from the first training data to update values of parameters of the first neural network; and
  training the dependency parsing neural network and the initial neural network layers of the first neural network, comprising:
    determining a parsing loss for a training example from the second training data; and
    backpropagating the parsing loss through the dependency parsing neural network and the initial neural network layers to update values of parameters of the dependency parsing neural network and the initial neural network layers.

8. The method of claim 7, wherein iteratively performing the following comprises:
  repeatedly alternating between performing the training of the first neural network and the training the parsing neural network and the initial neural network layers on different training examples from the first and second training data.

9. The method of claim 7, wherein obtaining the second training data comprises:
  for each of the training text sequences in the second training data:
    obtaining the dependency parse of the training text sequence; and
    unrolling the dependency parse to determine the set of parser states that defines the dependency parse of the training text sequence.

10. The method of claim 7, wherein training the first neural network and the dependency parsing neural network on the first and second training data further comprises:
  pre-training the first neural network prior to iteratively performing the training operations.

11. The system of claim 1, wherein the current parser state assigns a respective position in a stack or a buffer to at least some of the tokens in the input text sequence and identifies dependency relationships between the tokens in the input text sequence.

12. The system of claim 11, wherein the dependency relationships between the tokens in the input text sequence each comprise a dependency triple which identifies a head token from the input text sequence, a dependent token from the input text sequence, and a label that specifies a type of the relationship between the head token and the dependent token.

13. The system of claim 1, wherein the feature input for a given token includes features of the given token and features of one or more tokens in a window surrounding the given token.

14. A computer-implemented method comprising:
  processing tokens in an input text sequence using a first neural network, a first neural network comprising one or more initial neural network layers configured to, for each token in an input text sequence:
    receive a feature input for the token, and
    collectively process the feature input for the token to generate an alternative representation of the feature input for use in determining a part of speech of the token in the input text sequence; and
  processing the alternative representation using a dependency parsing neural network, the dependency parsing neural network configured to:
    process the alternative representations of the feature input for the tokens in the input text sequence generated by the one or more initial neural network layers to generate a dependency parse of the input text sequence, wherein the dependency parsing neural network is a state-based dependency parsing neural network and wherein the dependency parsing neural network is configured to generate the dependency parse by updating a current parser state by processing the alternative representation of the feature inputs for tokens in particular positions in the current parser state without directly using the parts of speech of the tokens in the input text sequence in generating the dependency parse.

15. The method of claim 14, wherein the first neural network further comprises an output layer configured to, for each token:
  receive the alternative representation of the feature input and to generate a respective score for each of a plurality part of speech tags that represents the likelihood that the corresponding part of speech is the part of speech of the token in the input text sequence.

16. The method of claim 14, wherein the dependency parsing neural network is configured to receive a state feature input comprising the alternative representation of the feature inputs for tokens in particular positions in the current parser state and to process the state feature input to generate a respective score for each of a plurality of parser state updates.

17. The method of claim 14, wherein the dependency parsing neural network does not directly use the parts of speech of the tokens in the input text sequence in generating the dependency parse.

18. The method of claim 14, further comprising processing the input text sequence using a natural language processing system, the natural language processing system configured to:
  analyze the input text sequence using the generated dependency parse as an input; and
  based on the analyzed input text sequence, cause performance of an operation that is responsive to the input text sequence.

19. The method of claim 14, wherein the current parser state assigns a respective position in a stack or a buffer to at least some of the tokens in the input text sequence and identifies dependency relationships between the tokens in the input text sequence.

20. The method of claim 14, wherein the dependency relationships between the tokens in the input text sequence each comprise a dependency triple which identifies a head token from the input text sequence, a dependent token from the input text sequence, and a label that specifies a type of the relationship between the head token and the dependent token.

21. The method of claim 14, wherein the feature input for a given token includes features of the given token and features of one or more tokens in a window surrounding the given token.

* * * * *